United States Patent [19]

Dupré

[11] Patent Number: 4,574,420
[45] Date of Patent: Mar. 11, 1986

[54] VERSATILE PARTICLE COLLECTOR APPARATUS

[75] Inventor: George T. Dupré, Barrington Hills, Ill.

[73] Assignee: NFE International, Ltd., Bensenville, Ill.

[21] Appl. No.: 583,437

[22] Filed: Feb. 24, 1984

[51] Int. Cl.⁴ .............................................. E01H 1/08
[52] U.S. Cl. ........................................ 15/331; 15/340; 15/352; 55/341 R; 55/345; 55/356; 55/432
[58] Field of Search ................. 15/340, 331, 352, 346; 55/429, 432

[56] References Cited

U.S. PATENT DOCUMENTS

| 1,560,612 | 11/1925 | Sims | 15/340 X |
| 2,432,757 | 12/1947 | Weniger | 55/432 X |
| 2,553,175 | 5/1951 | Davenport et al. | 55/432 X |
| 3,300,807 | 1/1967 | Berkowitz | 15/352 X |
| 3,744,653 | 7/1973 | Jensen | 15/340 X |
| 4,017,281 | 4/1977 | Johnstone | 15/340 X |
| 4,193,159 | 3/1980 | Beard | 15/346 X |
| 4,457,043 | 7/1984 | Oeberg et al. | 15/340 |

Primary Examiner—Chris K. Moore
Attorney, Agent, or Firm—Marshall, O'Toole, Gerstein, Murray & Bicknell

[57] ABSTRACT

A portable particle separator mounted on a frame with a collection chamber for particles and a vertical lifting unit having a pair of articulated parallel frame support elements hydraulically driven so that the collection chamber can be vertically moved to transfer particles to a dump truck. The particle separator includes a self-contained collection chamber with multiple inner chambers sealed by a common door. In an alternative embodiment, the portable particle separator includes a front floor conduit to pick up bulk particles and a front set of sweeper floor nozzles for small size particles.

5 Claims, 7 Drawing Figures

VERSATILE PARTICLE COLLECTOR APPARATUS

This invention relates to vacuum type apparatus for separating and collecting particles from an airstream, and in particular to portable, multiple separator/collector stage units for performing such operations on wet or dry particulate material such as sand, metal and wood chips, gravel, slag, cement, plastic pellets, mill scale, etc.

BACKGROUND OF THE INVENTION

Reference may be made to the following U.S. Pat. Nos. of interest: 3,780,502; 4,062,664; 4,111,670; 4,174,206; and 4,224,043.

There are presently available commercial devices capable of collecting relatively heavy, bulk, particulate material in foundries and other manufacturing and service facilities. Such units, as for instance, shown in one or more of the above-identified patents of interest, are powerful, heavy duty industrial type units ranging between 25 hp and 150 hp. Such units can readily collect bulk particulate material, but are not particularly adapted for use in cleaning floors of small amounts of particles. While there also are presently commercially available the market vacuum collecting devices much smaller than the aforementioned heavy duty vacuum collecting devices, such smaller devices can only be used for the single purpose of cleaning floors of small size particles, they are not adapted for pick up of large amounts of bulk material nor for pick up of heavy or large size particles.

Accordingly, it is desired to provide a single vacuum collecting unit of a portable type and which may be utilized to readily pick up large amounts of bulk material as well as small amounts of fine material.

In addition, it is desired to provide such a useful portable particle pick up unit with self-contained collecting chambers for receiving and collecting the particles separated from each of the separator stages. In particular, it is desired to thereafter enable the self-contained collection chambers to be readily emptied into standard dump trucks so that the collected particles can be removed. Present particle separator units require a fork lift truck to remove the filled particle collection hopper or require somewhat complex tilting mechanisms for removing the collected particles.

SUMMARY OF THE INVENTION

In accordance with the principles of the present invention, one aspect thereof is concerned with providing a portable particle separator apparatus which includes a frame, drive means, such as a tow tractor for moving the frame, a multistage particle separator mounted on the frame including a plurality of collection chambers and respectively associated vertically aligned collection hopper outlet section ends for collecting particles removed from an airstream, and lifting means movably connecting the particle separator to the frame for lifting the separator in substantially vertical alignment to the frame so as to enable transfer of the separated particles from the collection chamber. The vertical lifting means comprises a pair of articulated parallelogram support elements one end of which is mounted to the frame and the other end is connected to the particle separator unit.

A pair of hydraulic piston/cylinders mounted intermediate the frame and the particle separator unit move the particle separator with respect to the frame, the movement being confined by the pair of articulated parallelogram support members so that the movement is in substantially vertical alignment to the frame with the hopper outlet section ends maintained within the vertical projection of the frame. This permits the particle collection chamber in the separator unit to be readily placed in position to transfer the particles from the collection chamber to, for instance, a dump truck.

Further features are provided in accordance with other aspects of the invention. In particular, a flexible air conduit connects the particle separator air outlet and a blower mounted on the frame. Thus, when the particle separator unit is vertically moved with respect to the frame, the blower inlet is connected to the flexible air conduit so as to prevent possibly damaging particles from entering the blower during movement of the particle separator. Furthermore, the particle separator unit includes three particle separator stages—a cyclone separator first stage, a linear accelerator second stage, and a filter third stage, each stage of which includes a self-contained collection chamber for the separated particles. All three collection chambers are in turn sealed off by a door having a rubber sealing edge normally maintained in contact with the perimeter of the collection chambers. Hydraulic operating means are provided for pivoting the door from its sealed position to open the collection chambers and thereby permit transfer of the collected particles from the collection chambers.

In accordance with another aspect of the present invention, the portable particle separator apparatus as defined above with vertical means includes a floor sweeper attachment to the front of the drive means enabling the pick up of fine material such as during floor cleaning operations. In particular, the attachment includes a plurality of sweeper floor nozzles spring mounted to the front of the tow tractor such that the nozzle inlet is adjacent the floor to sweep clean and pick up by vacuum small particles such as fines. A manifold interconnects the floor nozzles to a flexible conduit which in turn is connected to the air inlet of the particle separator unit through a suitable valve mechanism. As an alternative embodiment, there may be further included an additional conduit extending from the front manifold with the conduit end terminating adjacent and slightly ahead of the front sweeper nozzles. This additional floor conduit may be used to pick up bulk particles on the floor ahead of the sweeper floor nozzles.

Accordingly, there is provided a versatile, portable particle separator apparatus wherein the collected particles may be more readily transferred from the collection chambers; wherein vertically lifting the particle separator with respect to the frame does not leave the blower inlet open to the atmosphere; wherein the collection chambers of the particle separator stages are sealed off by a single door enabling transfer of all collected particles by merely pivotting the door; a floor sweeper nozzle attachment is provided to pick up small size particles in a floor sweeping action during movement of the particle separator drive means; and a front bulk pick up conduit may be provided in advance of the floor sweeper nozzles so that both bulk material as well as fines can be collected in a sweeping action through movement of the particle separator drive means.

BRIEF DESCRIPTION OF THE DRAWINGS

The invention may be best understood by reference to the following description taken in conjunction with the accompanying drawings, in which like reference numerals identify like elements in the several figures and in which:

FIG. 3 is a front elevational view of the particle separator apparatus of FIG. 1 showing the front sweeper floor nozzles in more detail;

FIG. 4 is a sectional view of the particle separator unit of FIG. 1, illustrating the three separator stages, the respective collection chambers, and the common door sealing all of the collection chambers;

DETAILED DESCRIPTION

Figure 1:
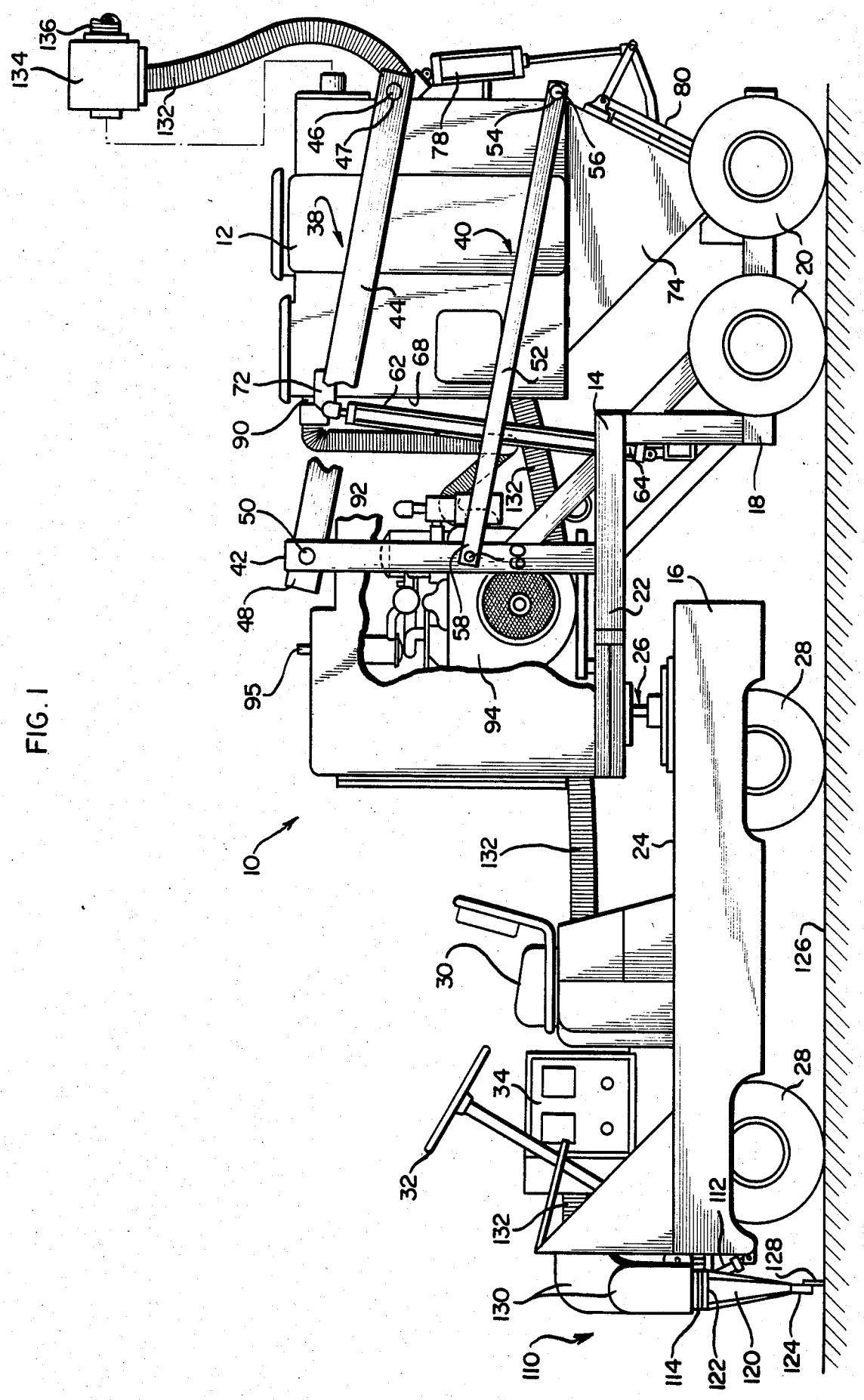
FIG. 1 is a side view of a versatile, portable particle separator apparatus with vertical lifting means and front sweeper floor nozzles.

Referring to FIGS. 1-4 of the drawings, there is illustrated a versatile, portable particle separator apparatus 10 which includes a multiple stage particle separator 12 mounted on a frame 14 which in turn is moved by a tow tractor 16. As may be seen with reference to FIGS. 1 and 2, frame 14 is Z-shaped with a lower horizontal flat portion 18 with wheels 20 mounted thereto, and an upper horizontal flat portion 22 mounted to bed 24 of tractor 16 by means of a suitable pivotal connection 26. It us understood of course that tractor 16 includes suitable gas, electric or other drive means for moving the tractor on wheels 28 and thereby towing the multiple stage particle separator. A driver's position 30, steering wheel 32 and operating conole 34 are provided to enable the driver to operate tractor 16 as well as the particle separator.

Figures 3, 4:
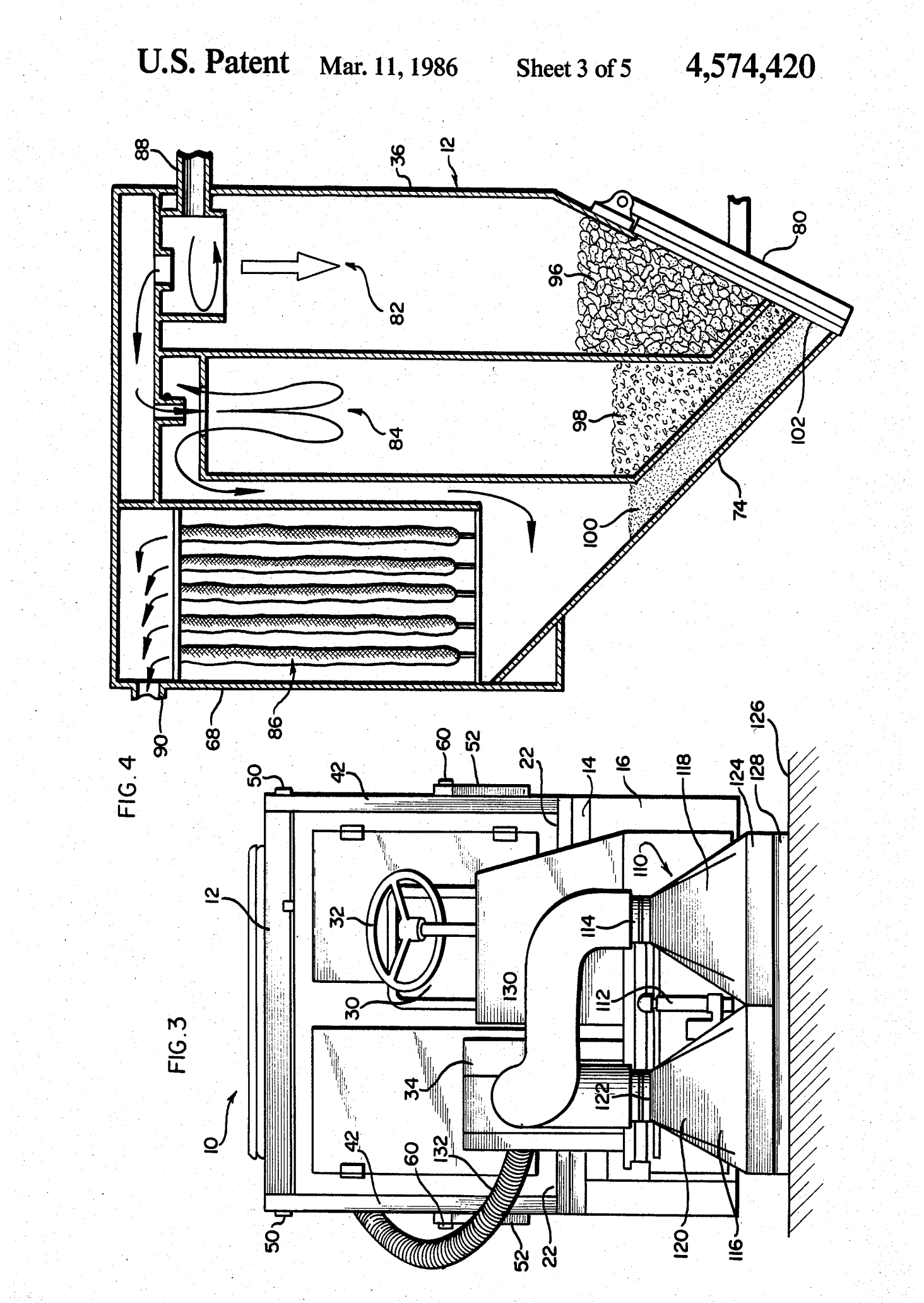

One side 36 of the particle separator is mounted by respective upper and lower articulated parallelogram supports 38, 40 to frame 14 by means of a pair of rigid vertical columns 42. Columns 42 are mounted on opposite sides of frame 14 and extend upwardly from horizontal flat frame portion 22 as shown in FIG. 3.

Upper articulated parallelogram support 38 includes a pair of support members 44 on respective opposite sides of the particle separator; a rigid rear support bar 46 rigidly mounted to particle separator side 36 and pivotally joined at connection 47 to one end of each support member 44; and the other end 48 pivotally mounted by means of a suitable pin 50 to vertical member 42. A cross brace member may be used to interconnect the respective ends 48 of each of the side members 44.

Lower articulated parallelogram support member 40 is formed in a similar manner with a pair of support members 52 on opposite sides of the particle separator, each being pivotally mounted at pivot connection 54 to a back support rod 56 rigidly connected to particle separator side 36. The opposite end 58 of each support member 52 is mounted to a respective vertical member 42 by means of a pivotal connection 60.

Two hydraulic lifting cylinders 62 are provided with a lower end 64 pivotally mounted to frame 14. Piston 66 is in turn connected to side 68 of particle separator 12 by means of a pivotal connection 70 to a rigid bracket 72.

Figure 2:
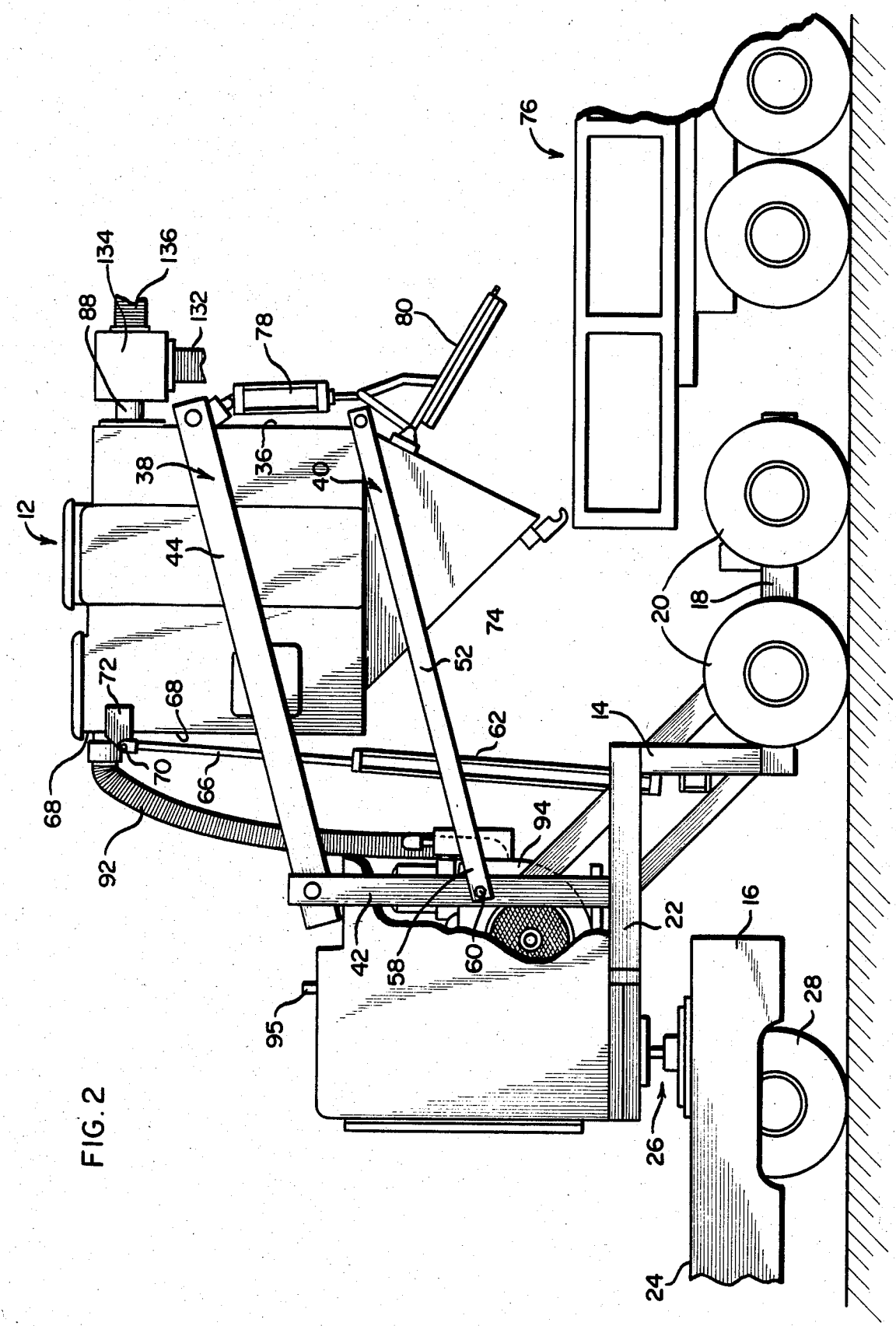
FIG. 2 is a fragmented side elevational view of the particle separator of FIG. 1, illustrating a pair of articulated parallelogram members enabling vertical lifting of the particle separator and collection chambers for simultaneous dumping of all collected particles.

Accordingly, separator unit 12 may be vertically moved from the operating position shown in FIG. 1 to the vertically lifted position shown in FIG. 2 for transferring collected particles within the collection chambers of separator 12. Operation of hydraulic cylinder/piston units 62 by the operator through control of a suitable hydraulic supply line (not shown) extends respective pistons 66 to vertically lift the particle separator stages. As can be seen by comparing FIGS. 1 and 2, articulated parallelogram support 38, 40 enable the movement in a substantially vertically aligned direction upwardly from frame 14 with the entire particle separator maintained within the vertical projection of the frame. This constrained movement enables the respective collection chambers in hopper portion 74 (FIG. 4) to be raised high enough so that the collected particles may be transferred to a dump truck 76 when a hydraulic door cylinder 78 is operated to open door 80.

Referring to FIG. 4, the multiple stage separator 12 includes a first stage cyclone separator 82, a second stage linear accelerator separator 84, and a third stage bag filter separator section 86. An incoming air stream is coupled through inlet 88 with the outgoing clean airstream coupled through an air outlet 90 and flexible conduit 92 to the inlet of a blower 94. Thus, an incoming airstream with particles coupled to air inlet 88 is passed through each separator stage and clean air is exhausted from the blower exhaust outlet 95 to the atmosphere.

Particle separator 12 includes hopper portion 74 formed integrally therewith below the respective collection chambers for the separator stages. After separation in each stage, the separated particles are collected in respective interior collection sections 96, 98 and 100 formed in hopper portion 74 as downwardly transverse outlet section extensions of each separator collection chamber. As seen in FIG. 4, the hopper outlet section ends are substantially vertical alignment, one end directly above the other. Door 80 includes a rubber seal 102 for sealing off all of the hopper outlet section ends simultaneously. Therefore, when the door 80 is opened, the hopper outlet section ends are opened so as to enable simultaneous transfer of all of the collected particles from the separator stages.

With reference to FIGS. 1 and 3, floor sweepers 110 are mounted at the front of the tow truck by means of a hydraulic cylinder/piston 112 and suitable mounting brackets 114. Operation of hydraulic piston/cylinder 112 permits the floor sweepers 110 to be lowered into operating position and to be raised into a non-operating position.

Floor sweepers 110 include floor nozzles 116, 118, each of which includes an upper portion 120 having a top cylindrical shaped portion 122 with upper body portion 120 tapering outwardly and terminating in a narrow elongated rectangular opening at bottom section 124. Bottom section 124 is located immediately above floor level 126 during operation. A resilient backing strip 128 formed of rubber or other resilient material is suitably mounted on bottom section 124 so as to extend from section 124 and enable small particles or fines on floor 126 to be swept or moved into position for suction pick up at bottom nozzle section 124.

Flexible conduits 130 are coupled through a Y adapter connection to flexible hose conduit 132 to communicate with valve 134 at separator air inlet 88. Valve 134 also includes an input for coupling flexible conduit 136 as an alternative to the floor sweeper 110.

It is to be understood of course that in the embodiment shown in FIGS. 1-4, in the case of substantially large size particles, or for bulk material particle pick up must be made through conduit 136. Where floor cleaning by pick up of small size particles and fines is required, this can be accomplished by using floor sweeper 110. In either event, when collection chambers 96, 98 and/or 100 have filled, or when transfer of the collected particles is otherwise desired, all of the collected particles can be transferred in one operation. The operator at that time operates hydraulic cylinder 62 to raise particle separator 12 from the normal particle pick up position shown in FIG. 1 to the collected particle transfer position shown in FIG. 2. A dump truck 76 or other suitable transfer mechanism is then located below collection hopper 74 containing collection chambers 96, 98 and 100. The operator then operates cylinder 78 to open door 80 thereby allowing transfer of the collected particles into the dump truck.

Thus, the embodiment shown in FIGS. 1-4 permits the collection of a full range of particle sizes and bulk pick up through rear conduit 136, or floor cleaning and the collection of small size particles through front sweeper 110; permits ready transfer of the collected particles by vertically raising the particle separator unit with attached collection chambers in a perpendicular, vertically aligned movement with respect to frame 14 to permit ready transfer to a dump truck; enables movement of the particle separator stages with respect to the suction blower without opening the blower inlet; and provides an extremely compact, portable particle separator which may be readily moved where needed with the capability of either rear bulk pick up or front floor sweeper particle pick up.

Figure 5:
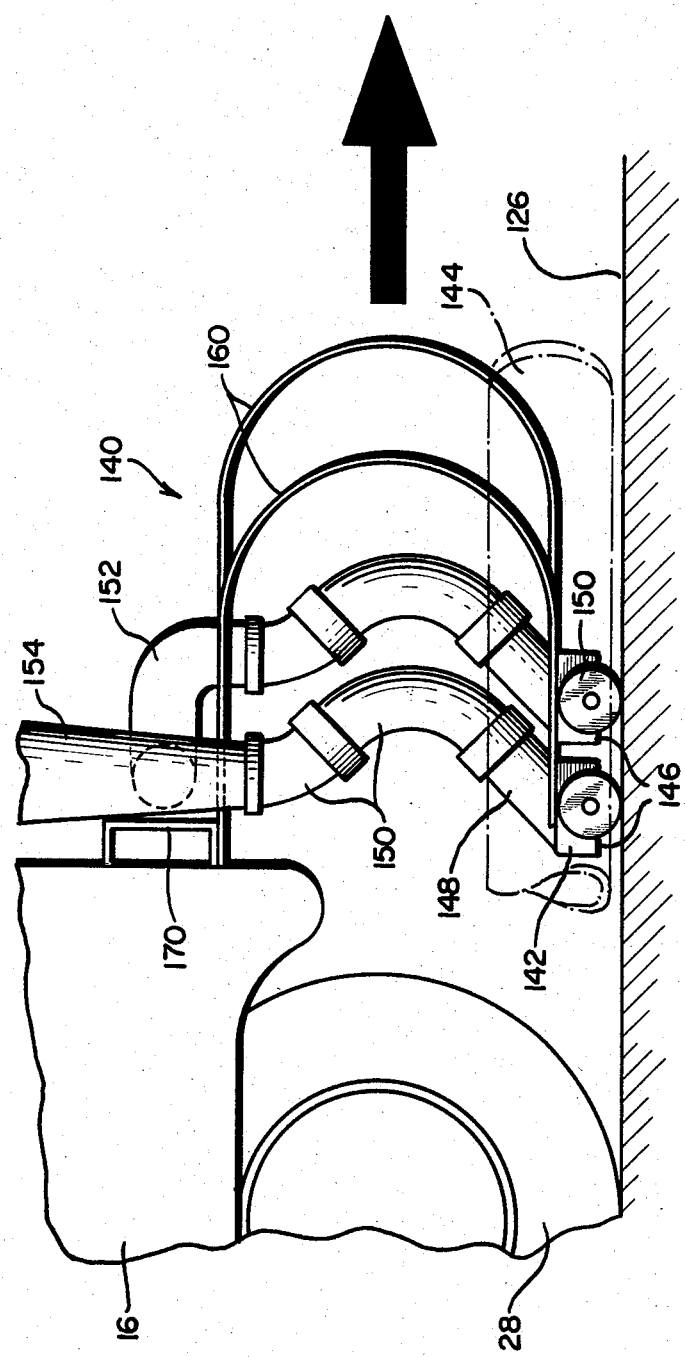
FIG. 5 is a fragmented side elevational view of an alternative embodiment illustrating spring mounted front sweeper floor nozzles.
Figure 6:
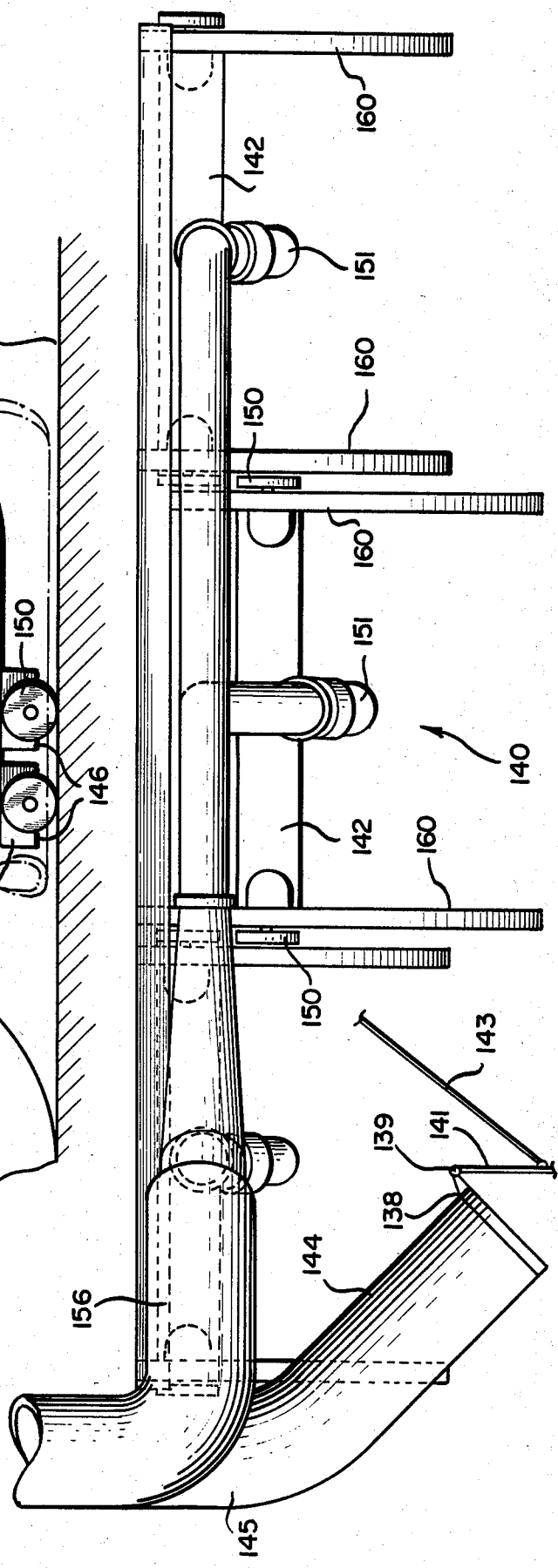
FIG. 6 is a fragmented top view of the alternative embodiment illustrating front sweeper floor nozzles and manifold with an additional front conduit added for bulk particle pick up.
Figure 7:
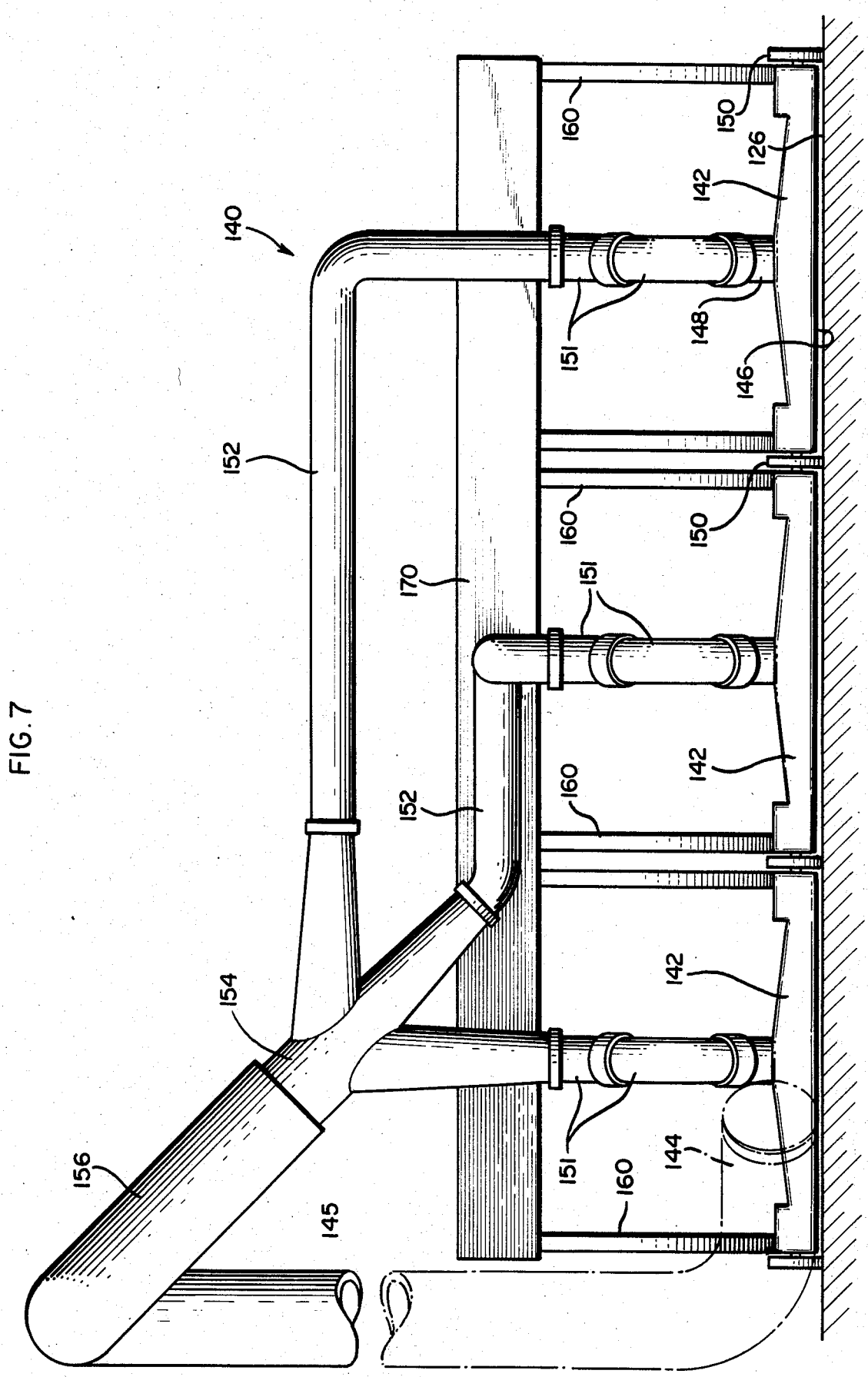
FIG. 7 is a fragmented front view of the alternative embodiment illustrating the front sweeper floor nozzles, manifold and front bulk pick up.

Referring now to FIGS. 5-7, there is illustrated an alternative embodiment of a floor sweeper unit. Front sweeper 140 includes three floor nozzles 142 for collecting small size particles and a nozzle end 144 of conduit 145 for bulk pick up of particles including large and medium size particles. A mounting bracket 138 with attached spring hinge 139 and closure plate 141 at nozzle end 144 permit an operator to open the nozzle end by pulling line 143. Releasing line 143 allows the spring hinge to pivot the closure plate and seal off nozzle end 144, thereby permitting particle pick up by nozzles 142.

Each floor nozzle 142 is formed of a unitary member having openings 146 at the bottom thereof and an outlet 148 at the top. Wheels 150 are mounted to nozzle 142 at an adjustable desired position permitting openings 146 to be located immediately adjacent and above floor 126. Suitable flexible connectors such as elbows 151 are coupled to one end of a return conduit 152, the other end of conduit 152 connected to manifold 154. The flexible connector elbows permit nozzles 142 to accommodate and follow variations in the floor surface.

Each of the floor nozzles 142 is connected to manifold 154 in a similar manner. Manifold 154 is in turn connected to conduit 156. Bulk floor conduit 145 and conduit 156 are connected through a suitable Y connector to flexible conduit 132 for return to valve 134 mounted on particle separator air inlet 88.

Each floor nozzle 142 includes a pair of spring biased members 160 mounted on opposite nozzle ends and extending upwardly for attachment to a channel member 170 which in turn is welded or otherwise secured to the frame of tractor 16. Thus, nozzles 142 are maintained in a resilient, spring biased position with wheels 150 in rolling contact on floor 126 as tractor 16 is movably driven. As shown most clearly in FIGS. 5 and 6, each floor nozzle 142 is separately mounted with the middle nozzle extending somewhat slightly ahead of the nozzles on either side thereof.

Thus, the alternative front pick up attachment of FIGS. 5-7 advantageously enables the operator to utilize front bulk pick up or the front sweeper attachment. All of the aforementioned advantages of the embodiment FIGS. 1-4 would also apply to the embodiment of FIGS. 5-7.

The foregoing detailed description has been given for clearness of understanding only, and no unnecessary limitations should be understood therefrom, as modifications will be obvious to those skilled in the art.

What is claimed is:

1. A portable particle separator apparatus comprising:

a frame;

drive means connected to one end of said frame for moving said frame;

a particle separator, having an air inlet and an air outlet, for removing particles from an airstream coupled to said air inlet, said particle separator including a plurality of sequential particle separator stages wherein particles are removed from said airstream in traversing between said air inlet and said air outlet, said particle separator having a respective collection chamber for collecting said particles removed from said airstream by an associated particle separator stage;

means for enabling an airstream coupled to said particle separator air inlet to sequentially pass through said plurality of separator stages and exit through said air outlet;

said particle separator including a hopper portion with a plurality of elongated interior collection sections each communicating with a respective collection chamber at one collection section end and extending downwardly transverse to a respective outlet section end such that the outlet section ends are in substantial vertical alignment, and pivotable door means for selecting sealing the outlet section ends during operation of said particle separator stages and for unsealing said outlet section ends to enable transfer of said collected particles from said hopper portion;

mounting means for mounting said particle separator on said frame with the substantially vertically aligned outlet section ends maintained within the vertical projection of said frame; and said mounting means including lifting means movably connecting said particle separator to said frame for lifting said separator in substantially vertical alignment with respect to said frame while maintaining the substantially vertically aligned outlet section ends within the vertical projection of said frame to enable transfer of said removed particles from said collection chamber.

2. A portable particle separator apparatus according to claim 1, wherein said frame is Z-shaped with a lower flat portion and an upper flat portion respectively extending in opposite directions outwardly from a central portion, and wherein said mounting means includes a pair of substantiallly vertical support columns mounted on said upper flat portion and respective pairs of parallel support members each pivotally mounted at one end to one of said vertical support columns and at the other end to said particle separator so that the particle separator is substantially vertically over the frame lower flat portion.

3. A portable particle separator apparatus according to claim 2, including hydraulic drive lift means mounted between said particle separator and said frame central portion for lifting said particle separator with respect to said frame lower portion.

4. A portable particle separator apparatus according to claim 1, including,
- bulk pick-up nozzle means for connection to said air inlet to couple a particle laden airstream to said air inlet;
- front sweeper means mounted to said vehicle, including sweeper nozzles locatable ahead of said vehicle to pick up small particles as said vehicle is moving;
- flexible conduit means for interconnecting said sweeper nozzles to said air inlet; and
- operable valve means intermediate said air inlets on one side and said bulk pick-up nozzles means and said flexible conduit means on the other side for enabling selective communication between said air inlet and either said bulk pick-up nozzle means or said flexible conduit means.

5. A portable particle separator apparatus according to claim 1, including;
- blower means rigidly mounted to said frame having a blower outlet communicating with the atmosphere and a blower inlet; and
- a flexible air conduit connected between said particle separator air outlet and said blower inlet for enabling said airstream to be sequentially drawn through said plurality of particle separator stages so that said airstream entering said blower means and eventually exiting said blower outlet is substantially free of said particles, including means for maintaining said flexible air conduit connected between said particle separator air outlet and said blower inlet during said lifting movement of said particle separator.

* * * * *

UNITED STATES PATENT AND TRADEMARK OFFICE
CERTIFICATE OF CORRECTION

PATENT NO. : 4,574,420

DATED : March 11, 1986

INVENTOR(S) : George T. Dupre'

It is certified that error appears in the above-identified patent and that said Letters Patent is hereby corrected as shown below:

Column 4, line 48, before "substantially" insert --in--;

Column 7, line 11, before "over" insert --aligned--.

Signed and Sealed this

Twenty-second Day of July 1986

[SEAL]

Attest:

DONALD J. QUIGG

Attesting Officer

Commissioner of Patents and Trademarks